(12) United States Patent
Gailloux et al.

(10) Patent No.: US 10,289,995 B1
(45) Date of Patent: May 14, 2019

(54) CARRIER ASSISTED MOBILE PHONE ON-LINE PAYMENT

(71) Applicant: Sprint Communications Company L.P., Overland Park, KS (US)

(72) Inventors: Michael A. Gailloux, Overland Park, KS (US); Benjamin M. Jones, Creighton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1038 days.

(21) Appl. No.: 14/258,882

(22) Filed: Apr. 22, 2014

(51) Int. Cl.
*G06Q 20/32* (2012.01)
*G06Q 20/40* (2012.01)

(52) U.S. Cl.
CPC ..... *G06Q 20/3226* (2013.01); *G06Q 20/4012* (2013.01)

(58) Field of Classification Search
None
See application file for complete search history.

(56) References Cited

U.S. PATENT DOCUMENTS

| | | | |
|---|---|---|---|
| 7,523,486 B1 | 4/2009 | Turner | |
| 8,099,363 B1 | 1/2012 | Kilchenstein, Jr. | |
| 8,151,328 B1 | 4/2012 | Lundy et al. | |
| 8,352,370 B1 * | 1/2013 | White | G06Q 40/02 705/38 |
| 8,923,812 B1 * | 12/2014 | Koum | H04W 4/14 455/410 |
| 9,014,662 B1 | 4/2015 | Gailloux et al. | |
| 9,147,187 B1 | 9/2015 | Gailloux et al. | |
| 9,582,787 B2 * | 2/2017 | Muthukrishnan | G06Q 20/02 |
| 9,792,603 B1 | 10/2017 | Gailloux et al. | |
| 9,830,587 B1 | 11/2017 | Bell et al. | |
| 10,007,903 B1 | 6/2018 | Gailloux et al. | |

(Continued)

OTHER PUBLICATIONS

N. Leavitt, "Payment Applications Make E-Commerce Mobile," in Computer, vol. 43, No. 12, pp. 19-22, Dec. 2010.URL: http://ieeexplore.ieee.org/stamp/stamp.jsp?tp=&arnumber=5662542&isnumber=5662531 (Year: 2010).*

(Continued)

*Primary Examiner* — Kathleen Palavecino
*Assistant Examiner* — Lance Y Cai

(57) ABSTRACT

A server hosting an electronic shopping application comprises a processor, a memory, and an application stored in the memory that receives a request for electronic shopping content from a mobile communication device, confirms the mobile communication device receives service from a participating wireless provider, routes the request through an internet gateway of the wireless provider, and receives a request to buy an item from the mobile communication device. The application further transmits a request for payment transaction information to the wireless provider, receives payment transaction information, transmits a payment dialog box to the mobile communication device, and receives an input PIN and an input selection of a payment mechanism from the mobile communication device. The application further receives payment information from the wireless provider, completes at least a portion of a checkout screen, and completes a payment transaction on behalf of the mobile communication device based on the payment information.

20 Claims, 7 Drawing Sheets

(56) References Cited

U.S. PATENT DOCUMENTS

| | | | |
|---|---|---|---|
| 2002/0107755 A1 | 8/2002 | Steed et al. | |
| 2006/0265327 A1 | 11/2006 | Rao et al. | |
| 2007/0156436 A1 | 7/2007 | Fisher et al. | |
| 2009/0271246 A1* | 10/2009 | Alvarez | G06Q 30/02 705/7.29 |
| 2010/0161433 A1 | 6/2010 | White | |
| 2011/0078081 A1 | 3/2011 | Pirzadeh et al. | |
| 2011/0208658 A1 | 8/2011 | Makhotin | |
| 2012/0029990 A1 | 2/2012 | Fisher | |
| 2012/0150667 A1 | 6/2012 | Salari | |
| 2012/0289188 A1* | 11/2012 | Marcus | G06Q 20/12 455/406 |
| 2013/0013499 A1 | 1/2013 | Kalgi | |
| 2013/0054320 A1* | 2/2013 | Dorso | G06Q 30/0268 705/14.4 |
| 2013/0198066 A1 | 8/2013 | Wall et al. | |
| 2013/0268752 A1 | 10/2013 | Morecki et al. | |
| 2014/0359484 A1 | 12/2014 | Morecki et al. | |
| 2015/0081435 A1 | 3/2015 | Griffiths | |
| 2015/0101062 A1 | 4/2015 | Silver et al. | |
| 2015/0110257 A1 | 4/2015 | Barbulescu et al. | |
| 2015/0186941 A1 | 7/2015 | Anthony et al. | |
| 2015/0302470 A1 | 10/2015 | Dru et al. | |
| 2015/0356556 A1 | 12/2015 | Celikyilmaz et al. | |

OTHER PUBLICATIONS

Decision on Appeal dated Mar. 22, 2017, U.S. Appl. No. 13/714,178, filed Apr. 3, 2012.
Notice of Allowance dated Jun. 22, 2017, U.S. Appl. No. 13/714,178, filed Apr. 3, 2012.
Notice of Allowance dated Jun. 16, 2017, U.S. Appl. No. 13/759,034, filed Feb. 4, 2013.
Office Action dated Aug. 29, 2013, U.S. Appl. No. 13/714,178, filed Apr. 3, 2012.
Final Office Action dated Mar. 26, 2014, U.S. Appl. No. 13/714,178, filed Apr. 3, 2012.
Advisory Action dated Jun. 16, 2014, U.S. Appl. No. 13/714,178, filed Apr. 3, 2012.
Examiner's Answer dated Feb. 4, 2015, U.S. Appl. No. 13/714,178, filed Apr. 3, 2012.
Second and Supplemental Examiner's Answer dated Mar. 9, 2015, U.S. Appl. No. 13/714,178, filed Apr. 3, 2012.
Restriction Requirement dated Mar. 19, 2015, U.S. Appl. No. 13/759,034, filed Feb. 4, 2013.
FAIPP Pre-Interview Communication dated Sep. 14, 2015, U.S. Appl. No. 13/759,034, filed Feb. 4, 2013.
FAIPP Office Action dated Dec. 8, 2015, U.S. Appl. No. 13/759,034, filed Feb. 4, 2013.
Final Office Action dated Jun. 14, 2016, U.S. Appl. No. 13/759,034, filed Feb. 4, 2013.
FAIPP Pre-Interview Communication dated Apr. 1, 2016, U.S. Appl. No. 14/313,968, filed Jun. 24, 2014.
FAIPP Office Action dated Jun. 8, 2016, U.S. Appl. No. 14/313,968, filed Jun. 24, 2014.
Final Office Action dated Aug. 12, 2016, U.S. Appl. No. 14/313,968, filed Jun. 24, 2014.
Advisory Office Action dated Oct. 12, 2016, U.S. Appl. No. 14/313,968, filed Jun. 24, 2014.
Dashlane, "Instant checkout, smart auto fill, secure passwords—Dashlane", https://dashlane.com/, last accessed Nov. 9, 2012.
Dashlane, "Secure encryption of your personal—Dashlane", https://dashlane.com/en/security, last accessed Nov. 9, 2012.
Dashlane, "Dashlane Security Whitepaper—Protection of User Data in Dashlane", Dashlane, Nov. 2011.
Dashlane, "Checkout easily online using Dashlane", https://dashlane.com/en/features, last accessed Nov. 9, 2012.
Dashlane, "Dashlane lets you fill out forms with a single click", https://dashlane.com/en/features/smartformfilling, last accessed Nov. 9, 2012.
Dashlane, "Securely Share web account passwords and important notes", https://dashlane.com/en/features/securesending, last accessed Nov. 9, 2012.
Bell, Timothy, et al., "System, Method, and Device for Customizing Online Merchant Payment Forms for Mobile Devices Without Merchant Integration," filed Apr. 3, 2012, U.S. Appl. No. 13/714,178.
Gailloux, Michael A., et al., "Companion Applets for Web-Based Transactions," filed Feb. 4, 2013, U.S. Appl. No. 13/759,034.
Gailloux, Michael A., et al., "System for Easing Customer Data Entry from Internet Advertising," filed Jun. 24, 2014, U.S. Appl. No. 14/313,968.
Notice of Allowance dated Feb. 26, 2018, U.S. Appl. No. 14/313,968, filed Jun. 24, 2014.

* cited by examiner

CARRIER ASSISTED MOBILE PHONE ON-LINE PAYMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

On-line purchases may be made using a mobile communication device. A mobile communication device user may implement a mobile application to shop for products on-line. When the user is ready to make a purchase, the mobile application may direct the user to a payment screen in response to a check-out request from the user. Various methods of payment may be offered at the payment screen. For example, the user may be able to select payment by credit card, PayPal, or select some other method of payment. Upon selecting a payment method, the user may be prompted to enter payment details for the payment type that the user selected in order to complete the purchase.

SUMMARY

In an embodiment, a server hosting an electronic shopping application is disclosed. The server comprises a processor, a memory, and an application stored in the memory that, when executed by the processor, receives a request for electronic shopping content from a mobile communication device, confirms that the mobile communication device receives service from a participating wireless communication service provider, routes the request through an internet gateway of a wireless communication service provider in response to the request for electronic shopping content, receives a telephone number associated with the mobile communication device from the internet gateway, and receives a request to buy an item from the mobile communication device. The application further transmits a request for payment transaction information to the wireless communication service provider in response to the request to buy, wherein the request for payment transaction information comprises the telephone number, receives payment transaction information from the wireless communication service provider, where the payment transaction information comprises a wireless communication service account personal identification number associated with the mobile communication device and an identification of one or more payment mechanisms associated with a wireless communication service account associated with the mobile communication device, and transmits a payment dialog box to the mobile communication device, wherein the payment dialog box prompts the mobile communication device to enter the wireless communication service account personal identification number. The application further receives an input personal identification number from the mobile communication device. If the input personal identification number matches the wireless communication service account personal identification number in the payment transaction information received from the wireless communication service provider, the application transmits a request for payment information associated with the input selection of the payment mechanism to the wireless communication service provider, receives payment information from the wireless communication service provider, wherein payment information comprises credit card information for a credit card historically associated with the mobile communication device and the wireless communication service account associated with the mobile communication device, completes at least a portion of a checkout screen based on the payment information, and completes a payment transaction on behalf of the mobile communication device based on the payment information.

In an embodiment, a method of conducting an on-line purchase transaction is disclosed. The method comprises determining that a mobile communication device is associated with an active wireless communication service account, identifying a phone number of the mobile communication device based on the wireless communication service account, and determining that a user of the mobile communication device has selected an option to allow information stored by a wireless communication service provider associated with the wireless communication service account to be provided to an on-line purchase site. The method further comprises transmitting a wireless communication service account personal identification number to the on-line purchase site in response to determining that the user selected the option, and transmitting a portion of a credit card number associated with the wireless communication service account to the on-line purchase site. The on-line purchase site prompts the user of the mobile communication device to input the wireless communication service account personal identification number, prompts the user with the portion of the credit card number to provide the remaining portion of the credit card number, identifies that an input personal identification number matches the wireless communication service account personal identification number, and completes a payment transaction.

In an embodiment, a method of completing an on-line sale is disclosed. The method comprises receiving a request to access an on-line web site from a mobile communication device, performing a hardware identification of the mobile communication device, routing the request to access the on-line web site via a wireless service provider internet gateway, receiving from the wireless service provider a phone number associated with the mobile communication device, and sending a request for payment transaction information to the wireless service provider in response to receiving a request to complete a purchase from the mobile communication device. The method further comprises receiving a wireless communication service account personal identification number and payment transaction information from the wireless service provider, comparing the wireless communication service account personal identification number to a personal identification number received from the mobile communication device, identifying that the personal identification number received from the mobile communication device matches the wireless communication service account personal identification number, and completing a payment transaction for the purchase.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
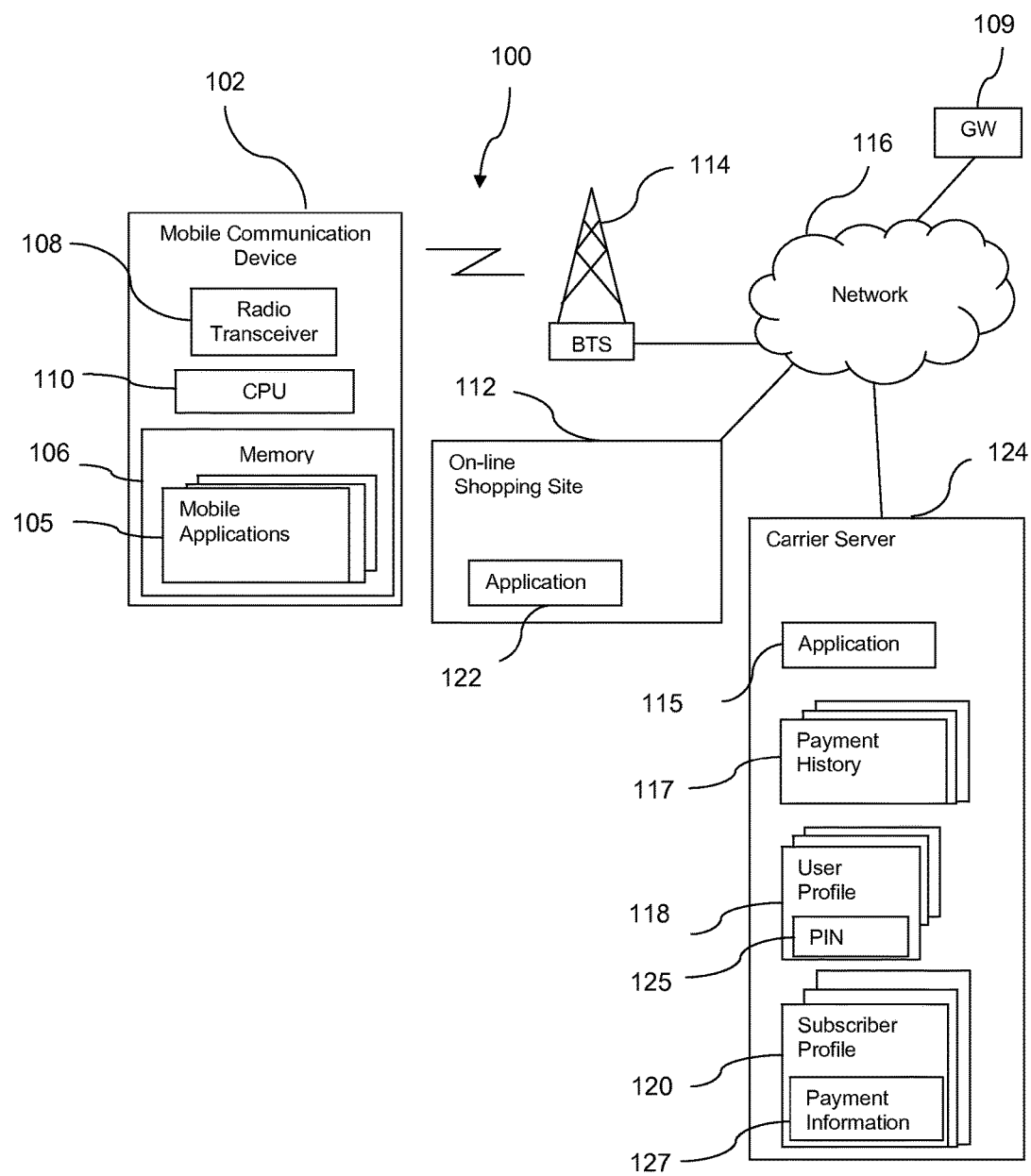
- FIG. 1 is an illustration of a communication system according to an embodiment of disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

On-line shoppers may use mobile communication devices, such as mobile telephones, to access on-line shopping sites, such as on-line application stores. In order to complete an on-line purchase, an on-line shopper may be asked to input credit card information, billing information, shipping information, and/or other information. On-line shoppers who are shopping from mobile communication devices may find it difficult and/or inconvenient to provide the information described above due to screen size limitations, keyboard limitations, and/or due to one or more other reasons. As a result of this difficulty, some on-line shoppers may decide to refrain from completing an on-line purchase until they have access to a device that provides a more convenient interface, such as a full-sized keyboard and monitor. For example, an on-line shopper using a mobile telephone to shop on-line may decide that inputting credit card information, billing information, and/or shipping information is too inconvenient to complete from the mobile telephone and may decide to wait until access to a desktop computer is available.

In some cases, on-line shopping sites may lose sales because on-line shoppers that decide to wait until access to a more convenient device is available may forget to complete the purchase or may otherwise fail to complete the purchase. The present disclosure teaches systems and methods that may be implemented to improve the convenience of shopping on-line from a mobile communication device and that may thereby reduce the incidence of lost sales due to delayed completion of purchase transactions. In the systems and methods described herein, identifying that a mobile communication device receiving service from a participating wireless communication service provider is conducting the on-line shopping, verifying an input personal identification number, and confirming historical usage of a credit card may provide increased confidence that an authorized device operated by an authorized user is using credit card information that is routinely used in association with the mobile communication device.

In an embodiment, a mobile communication device user may establish a personal identification number (PIN) for his/her wireless communication service account. The wireless communication service account may comprise the mobile communication device user's credit card information, billing information, address, and/or information about the mobile communication device user's subscription plan. The mobile communication device user's wireless communication service provider may present the mobile communication device user with an option to allow his/her credit card information, billing information, and/or other information to be released to select third-parties, such as businesses in partnership with the wireless communication service provider, upon successful input of the PIN associated with the mobile communication device user's wireless communication service account.

In an embodiment, an on-line shopping site partnered with the mobile communication device user's wireless communication service provider may identify that the mobile communication device owned by the mobile communication device user is being used in an attempt to make an on-line purchase. If the mobile communication device user has opted to allow the release of his/her information in response to successful input of his/her wireless communication service account PIN, the on-line shopping site may prompt the mobile communication device user to input said PIN. In the event that the input PIN matches the PIN for the mobile communication device user's wireless communication service account, one or more fields of a checkout screen may be populated based on information released to the on-line shopping site.

For example, a checkout screen may request the mobile communication device user to input credit card information, billing information, and shipping information, and these fields may be populated based on information released to the on-line shopping site without further input from the mobile communication device user. In some cases, the wireless communication service provider may consult a payment history before releasing credit card information. For example, the wireless communication service provider may not release credit card information unless the credit card has been associated with the mobile communication device user's wireless communication service account for at least three to six months. This may help provide protection to the user's credit card information.

Alternatively, the mobile communication device user may elect to have purchases billed to his/her wireless communication service account. It is expected that the systems and methods disclosed herein may improve convenience of completing on-line purchases from mobile communication devices and may thereby reduce the loss of sales that occurs as a result of delaying purchase due to inconvenience of inputting purchase information from mobile communication devices.

Turning now to FIG. 1, a communication system 100 is described. The communication system 100 may comprise an on-line shopping system and may be implemented to facilitate on-line shopping. In some contexts, on-line shopping may be referred to as electronic shopping, shopping electronically, or as some other term. In an embodiment, the communication system 100 comprises one or more mobile communication devices 102. The mobile communication device 102 may comprise a radio transceiver 108, a processor 110, a memory 106, and one or more mobile applications 105 stored in the memory 106.

The mobile applications 105 may comprise a variety of applications that may be pre-loaded on the mobile communication device 102 such as a calendar application, a short message text application, an internet access application, an email application, and/or other applications. The mobile applications 105 may further comprise applications that a user of the mobile communication device 102 may choose to download. For example, the mobile applications 105 may comprise applications that a user of the mobile communication device 102 downloaded from an application store or from some other source via the network 116 described below. The mobile applications 105 may be stored as firmware or software in the mobile communication device 102.

The mobile communication device 102 may be configured to invoke the radio transceiver 108 to establish a wireless communication link with a base transceiver station (BTS) 114. The radio transceiver 108, may communicate with the base transceiver station 114 using any of a wide variety of wireless communication protocols including one or more of a code division multiple access (CDMA) wireless communication protocol, a global system for mobile communication (GSM) wireless communication protocol, a long-term evolution protocol (LTE) wireless communication protocol, a world-wide interoperability for microwave access (WiMAX) wireless communication protocol or any other wireless communication protocol.

The base transceiver station 114 may provide communications connectivity to a network 116. The network 116 may comprise any combination of private and public networks. The communication system 100 further comprises an on-line shopping site 112. It is understood that the on-line shopping site 112 may be a representation of one or more servers that may be run on the behalf of a business entity associated with the on-line shopping site 112. The on-line shopping site 112 may run an electronic shopping application 122. The electronic shopping application 122 may be stored in the memory and executed by the processor of one or more of the servers running the on-line shopping site 112.

The communication system 100 further comprises a gateway 109 and a carrier server 124 which may be hosted by a wireless communication service provider of the mobile communication device 102. In some contexts, a wireless communication service provider that participates in the systems and/or methods disclosed herein may be referred to as a participating wireless communication service provider. The gateway 109 may be a media gateway and/or an internet gateway. In an embodiment, the gateway 109 may be a gateway of the wireless communication service provider of the mobile communication device 102.

The carrier server 124 comprises an application 115, one or more subscriber profiles 120 which may contain payment information 127 for one or more subscribers to the wireless communication service provided by the wireless communication service provider, one or more payment histories 117, and one or more user profiles 118 for one or more subscribers. In some contexts, subscribers may be referred to as mobile communication device 102 users. The carrier server 124 may store one or more of the application 115, the payment history 117, the user profile 118, the subscriber profile 120, and/or other things in a memory or data store associated with the carrier server 124.

The user profile 118 for a subscriber may contain a personal identification number (PIN) 125 associated with the subscriber's wireless communication service account. The wireless communication service account PIN 125 may be assigned to the user by the wireless communication service provider, the wireless communication service account PIN 125 may be chosen by the user, or the wireless communication service account PIN 125 may be assigned to the user in some other way. While described as a number, the wireless communication service account PIN 125 may be any type of password or identifier associated with the subscriber. In an embodiment the PIN 125 may be a portion of a number associated with the subscriber, for example a portion or all of a zip code of a postal address of the subscriber, a portion of or all of a street address of the subscriber, a portion of a phone number of the subscriber, or a portion of some other number associated with the subscriber. Using a portion of a number associated with the subscriber may make it easier for the subscriber to remember the PIN 125 and/or easier to inform the subscriber what the value of the PIN 125 is.

In an embodiment, the user of the mobile communication device 102 may be presented with an option to allow his/her credit card information, billing information, address, and/or other information to be provided to select third-parties in response to successful input of the user's wireless communication service account PIN 125. Credit card information may comprise cardholder name, expiration date, Card Verification Value (CVV), card type, and or other information. The user may further be given the option to allow select third-parties to bill purchases made from the mobile communication device 102 to the user's wireless communication service account or to a prepaid account.

In some cases, billing to the user's wireless communication service account and/or billing to a prepaid account may only occur if the user's wireless communication service account PIN 125 is successfully entered. Alternatively, in some cases, the user's wireless communication service provider may arrange for select third-parties to be able to bill purchases made from the mobile communication device 102 to the wireless communication service account associated with the mobile communication device 102 even in the absence of express authorization from the user of the mobile communication device 102.

Select third-parties may comprise businesses that are in partnership with the wireless communication service provider. For example, an on-line application store in partnership with the user's wireless communication service provider may be a select third-party to which credit card information, etc., may be released in response to successful input of the user's wireless communication service account PIN 125. In some cases, select third-parties may comprise third-parties selected by the user of the mobile communication device 102.

The user profile 118 may contain information about whether or not the user has chosen to allow information to be released to select third-parties in response to successful input of the user's wireless communication service account PIN 125. Further, the user profile 118 may contain information about whether or not the user of the mobile communication device 102 has authorized select third-parties to bill purchases to the user's wireless communication service account or to a prepaid account. In some cases, the user may have prioritized the options. For example, the user may have indicated that he/she would prefer to have release of credit card information, etc., to take precedence over billing to his/her wireless communication service account. In some cases, the user profile 118 may contain information about what third-parties the user has selected to be eligible to receive information from the carrier server 124.

In an embodiment, the subscriber profile 120 may comprise the payment information 127 and other information about the subscription associated with the mobile communication device 102. The payment information 127 may comprise information about a credit card (e.g., a credit card used to pay for the subscription), billing information associated with the mobile communication device 102, an address associated with the mobile communication device 102, and/or other information. The payment information 127 may comprise information about any credit card maintained on file in association with the subscriber profile 120. For example, information about a credit card that has been used to make purchases from the mobile communication device 102 may be maintained on file in association with the subscriber profile 120 even if the credit card has never been used to pay the wireless communication service provider. The subscriber profile 120 may further comprise information about the subscription plan associated with the mobile communication device 102.

The payment history 117 may comprise information about the history of payment for a user of the mobile communication device 102. For example, the payment history 117 may comprise information about the dates on which the user paid his/her bill, information about one or more credit cards, for example credit card(s) used by the user to pay his/her bill, information about other forms of payment used by the user, and/or other information. The payment history 117 may include a history of payment deficiencies. The history of payment deficiencies may be used to develop a risk factor for each credit card. For example, if a credit card has been denied, is at a limit, etc., a risk factor may be assigned to the credit card based on the payment deficiencies. The payment history 117 may comprise separate payment profiles for each credit card on file for the user of the mobile communication device 102, wherein the risk factor for each payment profile is determined by the risk factor of its associated credit card.

In an embodiment, the mobile communication device 102 may be used to access the on-line shopping site 112. A user of the mobile communication device 102 may select items for purchase and proceed to a checkout screen. In some contexts, the checkout screen may be referred to as a purchase screen, a final screen, a finish screen, a finish transaction screen, and/or the checkout screen may be referred to using some other term. It should be understood that while the fields populated by the on-line shopping site 112 are referred to as being populated on a checkout screen, the systems and methods of the present disclosure may be implemented to populate fields on one or more other screens as well. For example, fields on screens prior to a checkout screen may be populated using the systems and methods described herein.

In an embodiment, the on-line shopping site 112 may perform a hardware identification of the mobile communication device 102. The results of the identification may be used to determine whether or not the mobile communication device 102 belongs to an account maintained with a partnered wireless communication service provider. If the hardware identification indicates that the mobile communication device 102 does not belong to such an account, then payment information may not be transmitted from the carrier server 124 to the on-line shopping site 112. Thus, the on-line shopping site 112 may not populate fields of a checkout screen in such a situation. Similarly, the on-line shopping site 112 may verify that a registered user is using the mobile communication device 102. If the verification fails, then payment information may not be transmitted.

Further, the on-line shopping site 112 may perform a software identification of the mobile communication device 102. The software identification may allow the on-line shopping site 112 to determine branding information that may be used to confirm that the mobile communication device 102 is not being cloned. Performing hardware and/or software identifications may function as security measures to prevent unauthorized parties from making fraudulent purchases. The performance of hardware and/or software identifications in addition to requesting input of a wireless communication service account PIN 125 and/or the manual partial population of a credit card field of a checkout screen, as described herein below, may function as a security system configured to provide greater confidence that a mobile communication device 102 being used to make an on-line purchase is associated with a partnered wireless communication service provider and is in the hands of a user authorized to make on-line purchases using the systems and methods disclosed herein.

The on-line shopping site 112 may identify that the mobile communication device 102 receives wireless communication service from the wireless communication service provider that operates the carrier server 124. The on-line shopping site 112 may invoke an internet URL configured to guide traffic from the mobile communication device 102 through the gateway 109 which may be operated by the wireless communication service provider. Routing through the gateway 109 may allow the on-line shopping site 112 to acquire the telephone number of the mobile communication device 102 and/or other identifying characteristics of the mobile communication device 102. In an embodiment, the on-line shopping site may prompt the user of the mobile communication device 102 to select a payment method. For example, the on-line site 112 may prompt the user to select from one of paying by credit card, paying with PayPal, or paying with their wireless communication service account. The user may select a method of payment, and the on-line shopping site 112 may proceed according to the payment method selected.

The electronic shopping application 122 may send a request for the wireless communication service account PIN 125 associated with the mobile communication device 102 to the carrier server 124. The request may comprise the telephone number and/or other identifying information of the mobile communication device 102. In some cases, the request may be routed through a partnered aggregator, and the partnered aggregator may query the carrier server 124. The carrier server 124 may receive the request, and the application 115 may identify the wireless communication service account PIN 125 associated with the mobile communication device 102. In some cases, the identification of the wireless communication service account PIN 125 may be based on the telephone number of the mobile communication device 102.

The wireless communication service account PIN 125 associated with the mobile communication device 102 may be communicated to the on-line shopping site 112 if the user of the mobile communication device 102 has opted to allow the release of information to select third-parties. Opting to allow the release of information to select-third parties may involve providing the wireless communication service account PIN 125. If the user has not opted for information to be released, then the user may be prompted with an option to allow such release. In the event that permission to release is not obtained, the wireless communication service account PIN 125 may not be released to the on-line shopping site 112, and the user may be prompted to manually populate fields on the checkout screen.

In some cases, the user may have opted to allow his/her wireless communication service account PIN 125 to be released but not his/her credit card information. In such a case, the user may have opted to have purchases billed to his/her wireless communication service account. In that case, the user's wireless communication service account PIN 125 may be released to the on-line shopping site 112, and successful input of a personal identification number that matches the wireless communication service account PIN 125 may allow purchases made from the mobile communication device 102 on the on-line shopping site 112 to be billed to the wireless communication service account associated with the mobile communication device 102.

In an embodiment, the wireless communication service account PIN 125 may be hashed, with the current date and time for example, using a one-way secure cryptographic hash function algorithm. The hash function used may be an MD5 hash function, a SHA-2 hash function, a SHA-3 hash function, or another one-way secure cryptographic hash function. The resultant hashed wireless communication service account PIN 125 may be passed on to the on-line shopping site 112. A personal identification number entered by the user of the mobile communication device 102 may be hashed by the on-line shopping site 112 using the same one-way secure cryptographic hash function algorithm. The resultant hashed number derived from the input personal identification number on the mobile communication device 102 may be passed on to the electronic shopping application 122.

Hashing the wireless communication service account PIN 125 and input personal identification numbers may be done as a security measure to help prevent the actual wireless communication service account PIN 125 from being discovered by the on-line shopping site 112. The date and time values that may be used to perform the hashing may be defined based on different granularities of time. For example, the date and time values may be defined every minute, every 5 minutes, every 15 minutes, every hour, or they may be defined at other predefined intervals. Thus, if the hashing by the two parties is performed using the same time value, though the hashing may be done at different times, the hash value calculated may be the same, provided the time lag between the two hashes does not cross the predefined time granularity.

The on-line shopping site 112 may send a prompt to the mobile communication device 102 that asks for a personal identification number to be entered. If the user of the mobile communication device 102 successfully inputs a personal identification number that matches the wireless communication service account PIN 125 associated with the mobile communication device 102, then the electronic shopping application 122 may query the carrier server 124 for payment information such as credit card information, billing information, shipping addresses, and/or other information. As noted above, the successful matching may be based on comparing the PIN 125 provided by the network service provider at the time of the transaction. In some embodiments, the PIN 125 may be provided to the mobile communication device 102 and stored for use during a transaction. In this embodiment, the successful matching may be based on comparing the entered personal identification number with the stored PIN 125 on the mobile communication device 102. Upon successfully matching the PIN 125 number, the application 115 may identify the payment information requested by the on-line shopping site 112 and may send that information to the on-line shopping site 112. If the user selected to pay by billing to his/her wireless communication service account, then successful input of the wireless communication service account PIN 125 may result in a successful billing to his/her wireless communication service account.

In some cases, transmission of credit card information may depend on the payment history 117. For example, credit card information may not be transmitted to the on-line shopping site 112 unless a particular card has been associated with the user's wireless communication service account for a predefined amount of time, such as at least three months or at least six months. Alternatively, credit card information may not be transmitted to the on-line shopping site 112 if the user has exhibited faulty credit. For example, credit card information may not be transmitted if the payment history 117 indicates a history of missed payments, a history of late payments, that a credit limit has been reached and/or if the payment history 117 indicates other undesirable payment trends.

In an embodiment, the risk factor associated with a credit card may be used to determine whether or not credit card information will be transmitted. For example, credit card information for a given credit card may not be transmitted if the risk factor for the credit card is above a predefined threshold. Accordingly, credit card information may be transmitted if the risk factor for the credit card is below the predefined threshold. If the risk factor for a credit card is above the predefined threshold, the risk factor of one or more other credit cards on file may be evaluated, and credit card information corresponding to the alternative credit card may be transmitted if the risk factor for that credit card is below the predefined threshold. If credit card information is not sent, then the user may be prompted to manually populate credit card related fields.

After successful input of the wireless communication service account PIN 125, the on-line shopping site 112 may populate one or more fields of the checkout screen with information obtained from the carrier server 124. For example, the on-line shopping site 112 may populate a credit card number field with a credit card number received from the carrier server 124. In some contexts, information that may be used to populate fields of the checkout screen may be referred to as payment information. In some cases, the on-line shopping site 112 may only partially populate a field with information received from the carrier server 124. For example, the on-line shopping site may populate a credit card number field with the first twelve digits of a credit card number received from the carrier server 124 and may leave the remaining four to be provided by the user. It should be understood that any number of digits may be populated and that twelve is used herein for the purpose of example. Partially populating a field, such as a credit card number field, may provide an extra step of security to help ensure that the correct user is operating the mobile communication device 102.

In some cases, more than one field of the checkout screen may be partially or fully populated by the on-line shopping site 112. For example, a credit card number field and a billing address field may be partially or fully populated by the on-line shopping site 112 using information from the carrier server 124. In some cases, one or more fields may be fully populated while other fields are partially populated. For example, a billing address field may be fully populated while a credit card number field is only partially populated. Fully and/or partially populating fields of a checkout screen by the on-line shopping site 112 may improve the likelihood of a sale by improving the likelihood that the user of the mobile communication device 102 will complete the sale from the mobile communication device 102.

Figure 2:
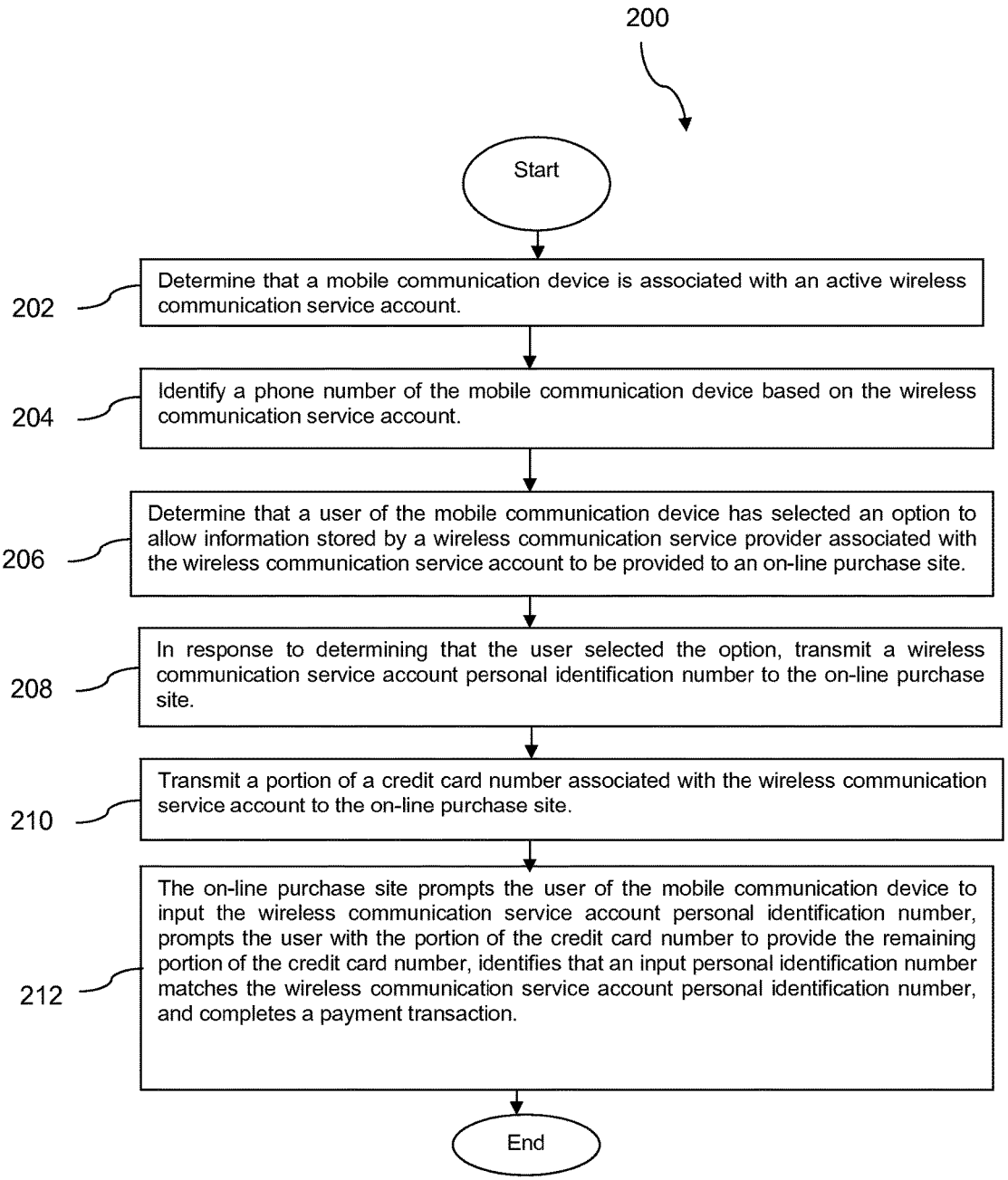
FIG. 2 is a flow chart illustrating a method according to an embodiment of the disclosure.

Turning now to FIG. 2, a method 200 is described. In an embodiment, the method 200 may be implemented by the communication system 100 described hereinabove with reference to FIG. 1. At block 202, a mobile communication device may be determined to be associated with an active wireless communication service account. A phone number of the mobile communication device may be identified at block 204 based on the wireless communication service account. At block 206, it may be determined that a user of the mobile communication device has selected an option to allow information stored by a wireless communication service provider to be provided to an on-line purchase site. In an embodiment, the information may comprise information associated with the wireless communication service account.

At block 208, a wireless communication service account personal identification number (PIN) may be transmitted to the on-line purchase site in response to determining that the option has been selected. A portion of a credit card number associated with the wireless communication service account may be transmitted to the on-line purchase site at block 210. At block 212, the on-line purchase site may prompt the user of the mobile communication device to input the wireless communication service account PIN. The on-line purchase site may further prompt the user to provide the remaining portion of the credit card number. The on-line purchase site may identify that a personal identification number input by the user matches the wireless communication service account PIN and may complete a payment transaction.

Figure 3:
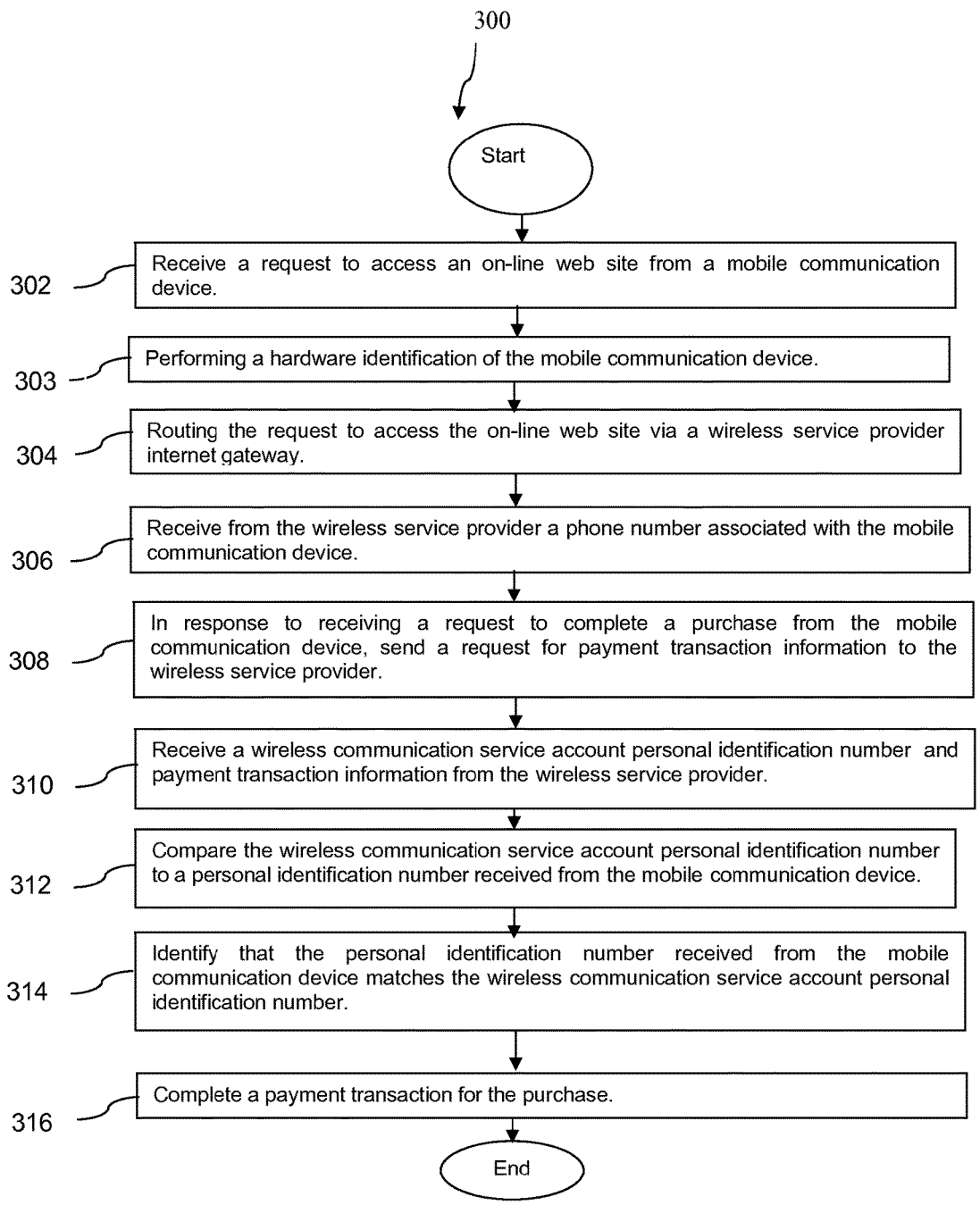
FIG. 3 is a flow chart illustrating another method according to an embodiment of the disclosure.

Turning now to FIG. 3, a method 300 is described. In an embodiment, the method 300 may be implemented by the communication system 100 described hereinabove with reference to FIG. 1. At block 302, a request to access an on-line web site may be received from a mobile communication device. At block 303, a hardware identification of the mobile communication device may be performed. The hardware identification may serve as a security measure to verify that the mobile communication device is registered with a participating wireless service provider. In an embodiment, the method 300 may further comprise performing a software identification of the mobile communication device. The software identification may be performed to identify the branding of the mobile communication device. The request may be routed via a wireless service provider internet gateway at block 304. A phone number associated with the mobile communication device may be received from the wireless service provider at block 306.

The mobile communication device may send a request to complete a purchase. At block 308, a request for payment transaction information may be sent to the wireless service provider in response to receiving the request to complete a purchase. In an embodiment, payment transaction information may comprise information configured to identify that an authorized user is operating the mobile communication device, information about authorization of information release, and/or other information. For example, an identification number configured associated with the user of the mobile communication device may be payment transaction information in some circumstances. Further, information about whether or not the user of the mobile communication device has authorized the wireless service provider to release information related to the user's wireless communication service account may be payment transaction information in some circumstances. In an embodiment, payment transaction information may be different from payment information described hereinabove with reference to FIG. 1 in that payment transaction information may not be used to populate fields of a checkout screen.

A wireless communication service account personal identification number and payment transaction information may be received from the wireless service provider at block 310. For example, a wireless communication service account personal identification number and information about whether or not the user of the mobile communication device has opted to allow the wireless service provider to release information to select third-parties may be received. At block 312, the wireless communication service account personal identification number may be compared to a personal identification number received from the mobile communication device. At block 314, the personal identification number received from the mobile communication device may be identified as matching the wireless communication service account personal identification number. A payment transaction for the purchase may be completed at block 316.

Figure 4:
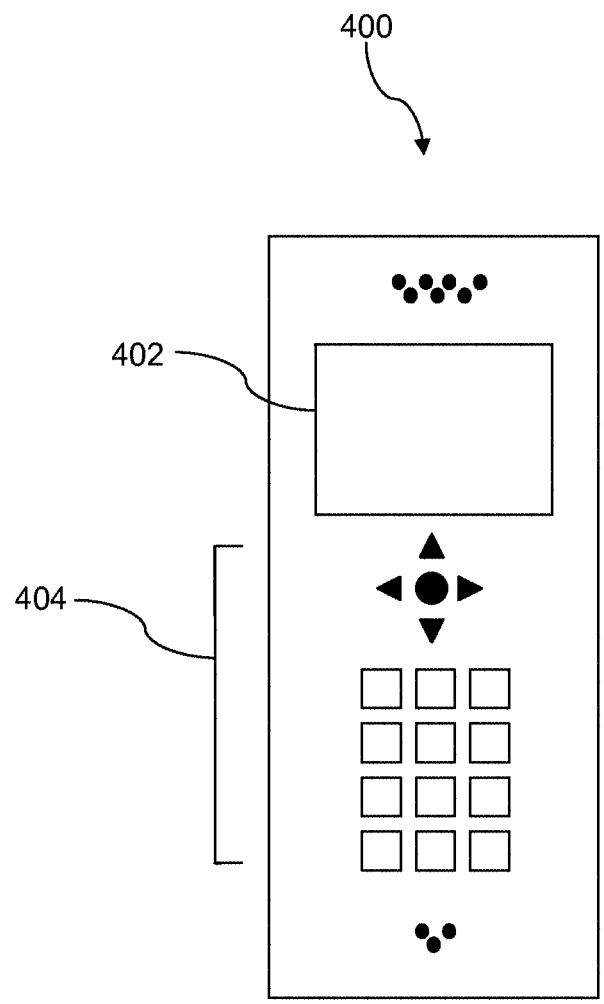
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
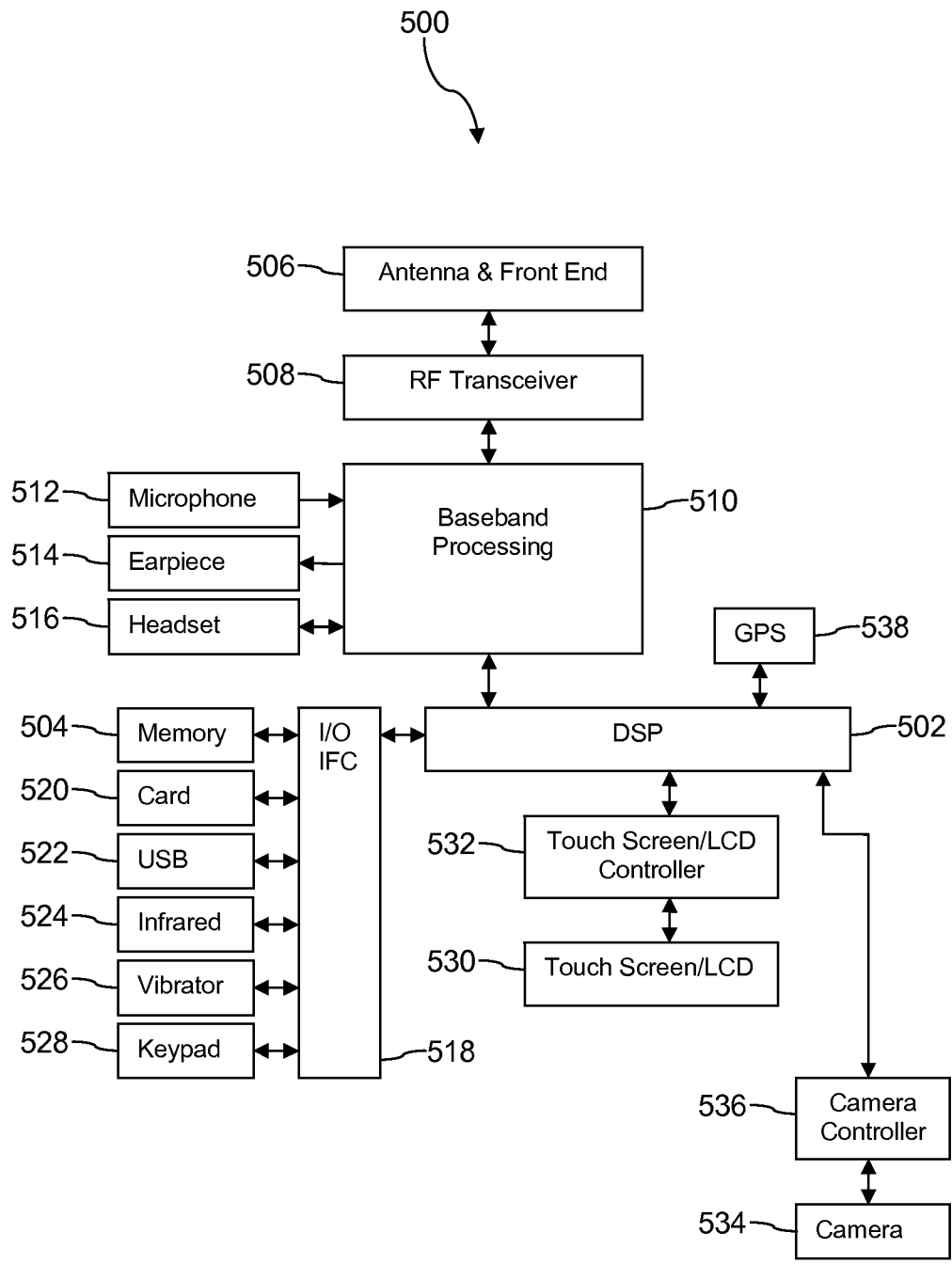
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
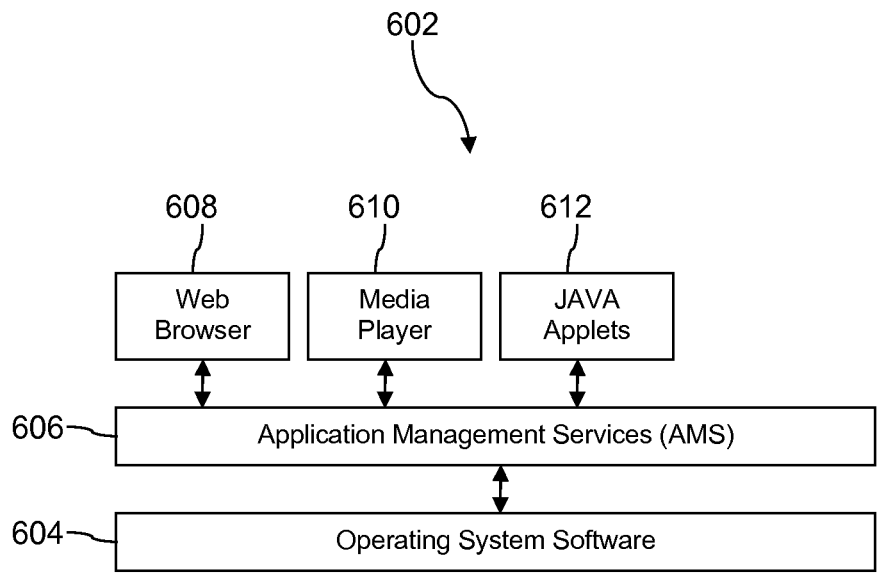
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
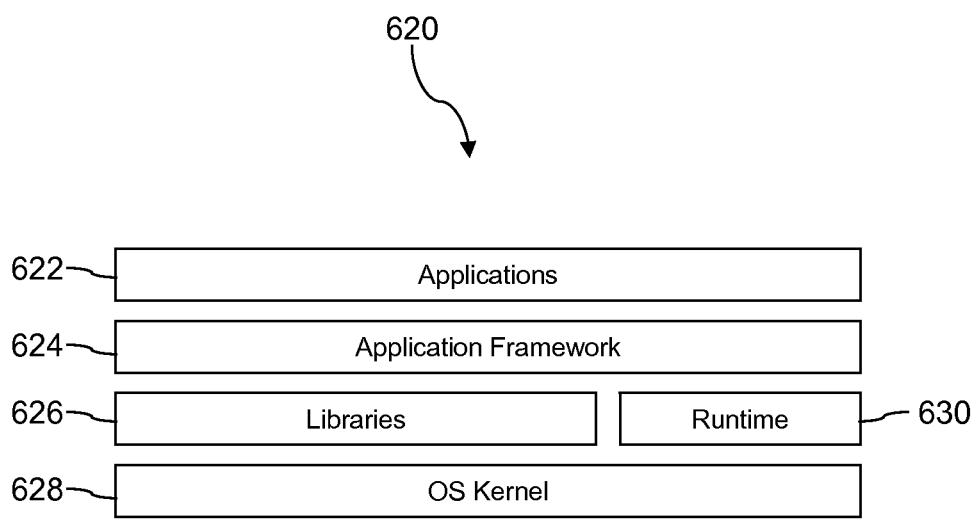
FIG. 6B is a block diagram of another software architecture of a mobile communication device according to an embodiment of a disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
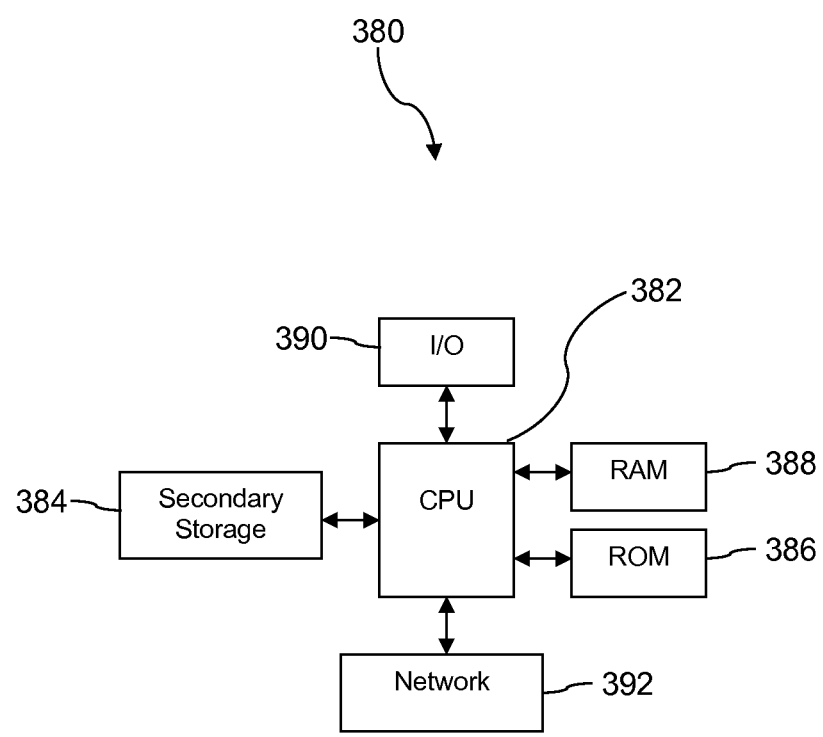
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A merchant server hosting an electronic shopping application, comprising:
   a processor of the merchant server;
   a memory of the merchant server; and
   an application stored in the memory of the merchant server that, when executed by the processor of the merchant server,
   receives a request for electronic shopping content from a mobile communication device,
   identifies a wireless communication service provider that the mobile communication device receives wireless communication service from,
   in response to the request for electronic shopping content, routes a message from the mobile communication device through a media gateway of the wireless communication service provider, whereby the wireless communication service provider identifies a telephone number associated with the mobile communication device,
   receives the telephone number associated with the mobile communication device from the wireless communication service provider,
   receives a request to buy an item from the mobile communication device,
   in response to the request to buy, transmits a request for payment transaction information to a wireless communication service provider server, wherein the request for payment transaction information comprises the telephone number associated with the mobile communication device,
   receives payment transaction information from the wireless communication service provider server, where the payment transaction information comprises a wireless communication service account personal identification number associated with the mobile communication device,
   transmits a payment dialog box to the mobile communication device, the payment dialog box prompting the mobile communication device to enter the wireless communication service account personal identification number,
   receives an input personal identification number,
   determines that the input personal identification number matches the wireless communication service account personal identification number,
   in response to determination that the input personal identification number matches the wireless communication service account personal identification number, transmits a request for payment information to the wireless communication service provider server
   receives payment information from the wireless communication service provider server, wherein payment information comprises credit card information
   populates at least a portion of a checkout screen on the mobile communication device with credit card information based on the payment information,
   prompts the mobile communication device to provide a remaining portion of the checkout screen, and
   completes a credit card payment transaction on behalf of the mobile communication device based on the payment information and based on the remaining portion of the checkout screen provided by the mobile communication device.

2. The server of claim 1, wherein the telephone number associated with the mobile communication device is associated with a subscription plan of the mobile communication device and with a user profile associated with the mobile communication device, and wherein the application further authenticates the mobile communication device based on the telephone number.

3. The server of claim 1, wherein the input personal identification number received from the mobile communication device is associated with a subscription plan associated with the mobile communication device and with a user profile associated with the mobile communication device.

4. The server of claim 1, wherein the payment dialogue box further prompts the mobile communication device to select the payment mechanism from among the one or more payment mechanisms.

5. The server of claim 1, wherein payment information is received from the mobile communication device when payment information is unavailable from the wireless communication service provider server.

6. A method of completing an on-line sale, each step in the method performed by an application stored in a non-transitory memory of a merchant server and executed by a processor of the merchant server, the method comprising:
   receiving a request to access an on-line web site from a mobile communication device;
   performing a hardware identification of the mobile communication device;
   identifying a wireless communication service provider that the mobile communication device receives wireless communication service from based on the hardware identification of the mobile communication device;
   routing the request to access the on-line web site via a media gateway of the wireless communication service provider, whereby the wireless communication service provider identifies a telephone number associated with the mobile communication device;
   receiving the telephone number associated with the mobile communication device from the wireless communication service provider server;
   in response to receiving a request to complete a purchase from the mobile communication device, sending a request for payment transaction information to a wireless communication service provider server, where the request for payment transaction information comprises the telephone number associated with the mobile communication device;

receiving a wireless communication service account personal identification number and payment transaction information from the wireless communication service provider server;

comparing the wireless communication service account personal identification number received from the wireless communication service provider server to a personal identification number received from the mobile communication device;

determining that the personal identification number received from the mobile communication device matches the wireless communication service account personal identification number received from the wireless communication service provider server; and completing a payment transaction for the purchase.

7. The method of claim 6, further comprising performing a software identification of the mobile communication device configured to identify the branding of the mobile communication device.

8. The method of claim 6, wherein the telephone number is associated with a subscription plan of the mobile communication device and is further associated with a user profile of the mobile communication device.

9. The method of claim 6, wherein sending the request for payment transaction information to the wireless communication service provider server comprises querying an intermediate third-party server.

10. The method of claim 6, wherein completing the payment transaction comprises billing the transaction to a pre-paid wireless communication subscription plan associated with the mobile communication device.

11. The method of claim 6, wherein completing the payment transaction comprises populating a payment field of a purchase screen with credit card information associated with the subscription plan of the mobile communication device.

12. The method of claim 6, wherein the payment transaction information comprises an identification of one or more payment mechanisms associated with a wireless communication service account associated with the mobile communication device.

13. The method of claim 12, further comprising:
transmitting a request for payment information associated with an input selection of a payment mechanism of the one or more payment mechanisms to the wireless communication service provider server when the personal identification number received from the mobile communication device matches the wireless communication service account personal identification number in the payment transaction information received from the wireless communication service provider server;

receives payment information from the wireless communication service provider server, wherein payment information comprises credit card information for a credit card associated with the mobile communication device and the wireless communication service account associated with the mobile communication device; and completes at least a portion of a checkout screen based on the payment information, wherein the payment transaction is completed based on the payment information.

14. The method of claim 13, wherein the credit card information comprises less than all of the digits of the credit card.

15. The method of claim 14, wherein completion of the at least the portion of the checkout screen comprises populating a credit card number field with the first 12 digits of the credit card.

16. The method of claim 13, wherein a history of payment associated with the credit card is identified, and wherein the payment information is received based on the history of payment.

17. The method of claim 16, further comprising:
receiving the history of payment; and
using the history of payment to make recommendations for purchase of additional electronic shopping content.

18. The method of claim 12, further comprising:
transmitting a request for payment information associated with an input selection of a payment mechanism of the one or more payment mechanisms to the wireless communication service provider server when the personal identification number received from the mobile communication device matches the wireless communication service account personal identification number in the payment transaction information received from the wireless communication service provider server;
receiving instructions to prompt a user to input full credit card information on the mobile communication device based on a history of payment associated with the credit card, wherein the payment transaction is completed based on the inputted full credit card information.

19. The server of claim 1, wherein the application performs a hardware identification of the mobile communication device to confirm that the mobile communication device receives service from the participating wireless communication service provider server.

20. The server of claim 1, where the application receives shipping information from the wireless communication service provider server and populates the shipping information into the checkout screen.

* * * * *